United States Patent
Jung

(10) Patent No.: US 7,409,084 B2
(45) Date of Patent: Aug. 5, 2008

(54) METHOD FOR DETERMINING DARK CONDITION AND METHOD FOR INTERPOLATING COLOR IN IMAGE SENSOR

(75) Inventor: Byung-Geun Jung, Chungcheongbuk-do (KR)

(73) Assignee: MagnaChip Semiconductor, Ltd., Chungcheonbuk-Do (KR)

( * ) Notice: Subject to any disclaimer, the term of this patent is extended or adjusted under 35 U.S.C. 154(b) by 588 days.

(21) Appl. No.: 11/094,628

(22) Filed: Mar. 29, 2005

(65) Prior Publication Data

US 2005/0248670 A1    Nov. 10, 2005

(30) Foreign Application Priority Data

May 6, 2004    (KR)    ............. 10-2004-0032011

(51) Int. Cl.
*G06K 9/00*    (2006.01)
*G06K 9/40*    (2006.01)
*G06K 9/32*    (2006.01)
(52) U.S. Cl. .............. 382/167; 382/274; 382/300
(58) Field of Classification Search ............. 382/162, 382/167, 274, 300, 200; 348/241, 243, 246
See application file for complete search history.

(56) References Cited

U.S. PATENT DOCUMENTS

| 5,097,335 | A * | 3/1992 | Cok .................... 348/251 |
| 6,388,706 | B1 * | 5/2002 | Takizawa et al. ........... 348/273 |
| 6,577,408 | B1 * | 6/2003 | Rusnack et al. ............ 358/1.9 |
| 7,116,443 | B2 * | 10/2006 | Handley et al. ............ 358/1.9 |
| 2003/0020932 | A1 * | 1/2003 | Youngers .................. 358/1.9 |
| 2003/0020933 | A1 * | 1/2003 | Youngers .................. 358/1.9 |
| 2005/0238250 | A1 * | 10/2005 | Jo ........................... 382/275 |

FOREIGN PATENT DOCUMENTS

JP    10-178650    6/1998

* cited by examiner

*Primary Examiner*—Colin LaRose
(74) *Attorney, Agent, or Firm*—Blakely, Sokoloff, Taylor & Zafman LLP

(57) ABSTRACT

Disclosed are a method for determining a dark condition in an image sensor to prevent a color noise and a method for interpolating colors. The present invention forms a window with a size of 5×5 array and determines a local color distribution based on a center pixel by using the window with the size of 5×5 array, thereby determining a dark condition with respect to the local color distribution. Thus, it is possible not to degrade chroma with respect to a whole image but locally degrade chroma, thereby producing a black and white image. Through differently and locally performing a color interpolation according to a dark condition determination, it is possible to correct an error of an imperfect black possibly generated during an expression of an imperfect black and white image due to the color interpolation and to reduce a color noise in the corresponding portion.

8 Claims, 3 Drawing Sheets

FIG. 3A

|   |   |   |   |   |
|---|---|---|---|---|
| $X_{11}$ | $X_{12}$ | $X_{13}$ | $X_{14}$ | $X_{15}$ |
| $X_{21}$ | $X_{22}$ | $X_{23}$ | $X_{24}$ | $X_{25}$ |
| $X_{31}$ | $X_{32}$ | $X_{33}$ | $X_{34}$ | $X_{35}$ |
| $X_{41}$ | $X_{42}$ | $X_{43}$ | $X_{44}$ | $X_{45}$ |
| $X_{51}$ | $X_{52}$ | $X_{53}$ | $X_{54}$ | $X_{55}$ |

FIG. 3B

|   |   |   |   |   |
|---|---|---|---|---|
| $X_{11}$ | $X_{12}$ | $X_{13}$ | $X_{14}$ | $X_{15}$ |
| $X_{21}$ | $X_{22}$ | $X_{23}$ | $X_{24}$ | $X_{25}$ |
| $X_{31}$ | $X_{32}$ | $X_{33}$ | $X_{34}$ | $X_{35}$ |
| $X_{41}$ | $X_{42}$ | $X_{43}$ | $X_{44}$ | $X_{45}$ |
| $X_{51}$ | $X_{52}$ | $X_{53}$ | $X_{54}$ | $X_{55}$ |

FIG. 3C

|   |   |   |   |   |
|---|---|---|---|---|
| $X_{11}$ | $X_{12}$ | $X_{13}$ | $X_{14}$ | $X_{15}$ |
| $X_{21}$ | $X_{22}$ | $X_{23}$ | $X_{24}$ | $X_{25}$ |
| $X_{31}$ | $X_{32}$ | $X_{33}$ | $X_{34}$ | $X_{35}$ |
| $X_{41}$ | $X_{42}$ | $X_{43}$ | $X_{44}$ | $X_{45}$ |
| $X_{51}$ | $X_{52}$ | $X_{53}$ | $X_{54}$ | $X_{55}$ |

METHOD FOR DETERMINING DARK CONDITION AND METHOD FOR INTERPOLATING COLOR IN IMAGE SENSOR

FIELD OF THE INVENTION

The present invention relates to a method for preventing a color noise in an image sensor; and more particularly, to a method for determining a dark condition in an image sensor to prevent a color noise and a method for interpolating colors.

DESCRIPTION OF RELATED ARTS

An image sensor is a device producing an image by using a characteristic of a semiconductor device to react with a light. That is, the image sensor is a device detecting a brightness and a wavelength of each different light coming from each subject, thereby reading the light in an electrical value. Accordingly, the image sensor serves a role in making the electrical value to a level capable of performing a signal processing.

This image sensor exemplifies a complementary metal oxide semiconductor (CMOS) image sensor and a charge coupled device (CCD) and these image sensors are used for a portable terminal, a terminal for a computer, an image camera for a computer and a digital camera.

In a conventional case, an exposing degree of the image sensor or a color distribution of a whole image, i.e., a whole frame, is determined and then, whole chroma is decreased by using the determined exposing degree of the image sensor or the color distribution of the frame.

Meanwhile, a method for controlling the chroma by using the color distribution of the image calculated in a frame unit becomes a factor for degrading an image quality. That is, degradation of the chroma of the image deteriorates definition of an image, thereby lowering a quality of products.

SUMMARY OF THE INVENTION

It is, therefore, an object of the present invention to provide a method for determining a dark condition in an image sensor capable of preventing a color noise and a method for interpolating colors by considering a dark condition capable of removing a color noise as not degrading chroma with respect to an image.

In accordance with one aspect of the present invention, there is provides a method for determining a dark condition in an image sensor, including the steps of: setting a predetermined window based on a center pixel; calculating average values for each RGB in the window; comparing each of the RGB average values with a corresponding dark condition threshold value; and determining the center pixel as a dark condition since all of the RGB average values are smaller than the dark condition threshold values.

In accordance with another aspect of the present invention, there is provided a method for interpolating colors, including the steps of: setting a predetermined window based on a center pixel; calculating an average value for each RGB in the window; comparing each of the RGB average values with a corresponding dark condition threshold value; determining the center pixel as a dark condition since all of the RGB average values are smaller than the dark condition threshold values; and interpolating all of the RGB average values of the center pixel into the G average value as the center pixel is determined as the dark condition.

BRIEF DESCRIPTION OF THE DRAWINGS

The above and other objects and features of the present invention will become better understood with respect to the following description of the preferred embodiment given in conjunction with the accompanying drawings, in which:

FIGS. 3A to 3C are diagrams illustrating different types of windows with a size of 5×5 array in accordance with the present invention.

DETAILED DESCRIPTION OF THE INVENTION

Hereinafter, a method for determining a dark condition and a method for interpolating colors in accordance with the present invention will be explained in detail with reference to the accompanying drawings.

Figure 1:
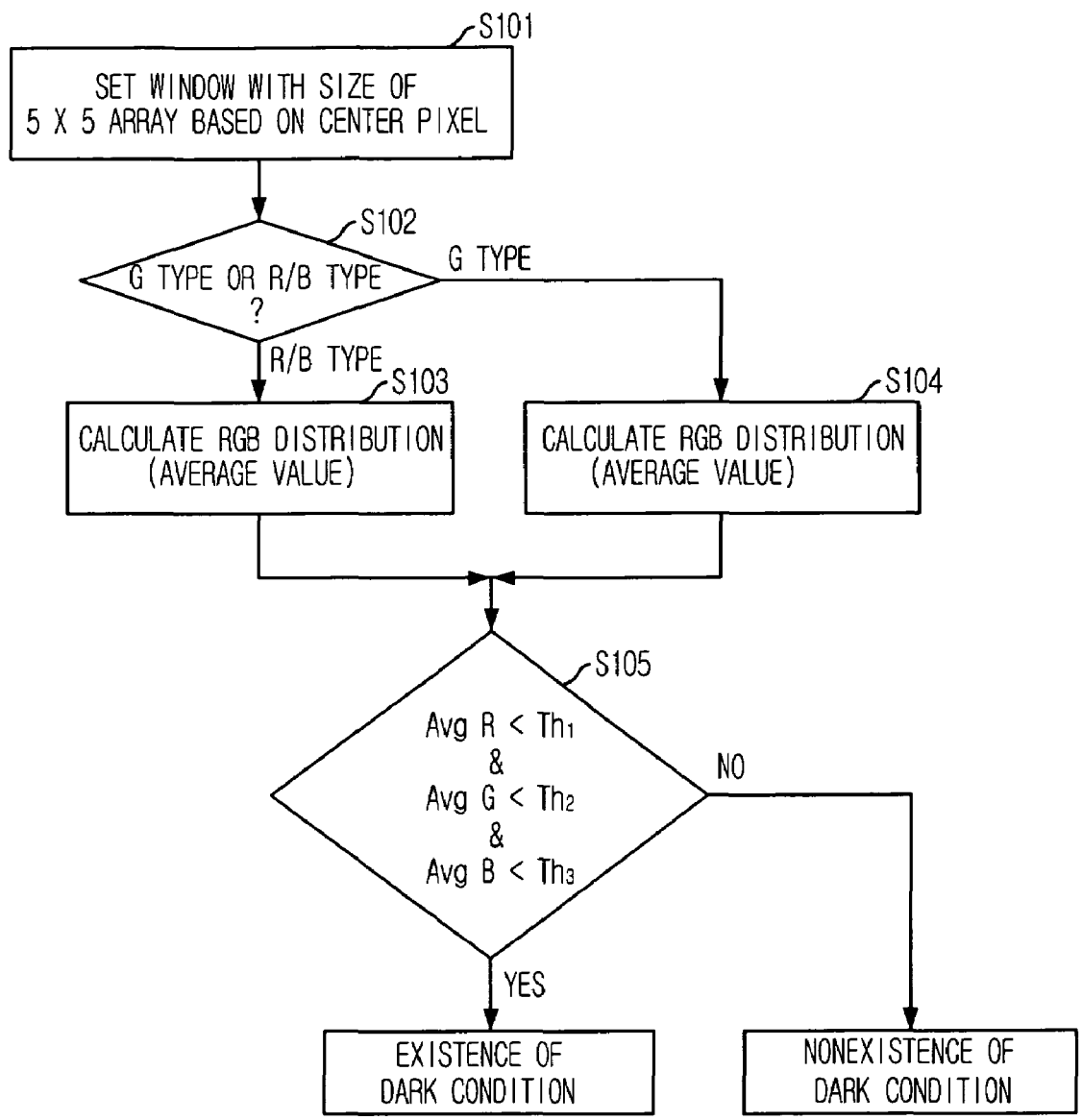
FIG. 1 is a flowchart illustrating a method for determining a dark condition in accordance with a preferred embodiment of the present invention.
Figure 2:
FIG. 2 is a diagram illustrating a window with a size of 5×5 array for determining a dark condition in accordance with the present invention.

FIG. 1 is a flowchart illustrating a method for determining a dark condition in accordance with the present invention. FIG. 2 is a diagram illustrating a window with a size of 5×5 array for determining a dark condition. FIGS. 3A to 3C are diagrams illustrating different types of windows with a size of 5×5 array.

Hereinafter, with reference to FIGS. 1 to 3, the steps of determining the dark condition in accordance with the present invention will be examined.

In the course of conventional color interpolation and color correction, a color distribution, i.e., average values for each red (R), green (G) and blue (B), of an image, i.e., a whole frame, is calculated for preventing a generation of a color noise. Thus, it is determined whether a dark condition is existed or not in a corresponding frame based on the color distribution.

However, in accordance with the present invention, the method for determining the dark condition is not wholly performed to the frame but is partially performed to the frame. A window (W) with a size of 5×5 array is selected in accordance with the present invention.

Accordingly, at step S501, the window (W) with the size of 5×5 array is set based on a center pixel.

FIG. 2 illustrates an embodiment of the window of the size of 5×5 array explained in FIG. 1. The window (W) is consisted of $x_{11}$ to $x_{55}$ based on the center pixel that is $x_{33}$.

The window with the size of 5×5 array explained above can be expressed with the following equation 1.

$$\sum_{j=1}^{5}\sum_{i=1}^{5} x_{ji} \quad (j = \text{column}, i = \text{row}) \qquad \text{Eq. 1}$$

Herein, the center pixel is $x_{33}$ of which both i and j are 3.

At step S102, it is determined whether the window (W) is a G-type or an R/B-type.

The G-type, the R-type and the B-type are determined based on the center pixel, $x_{33}$. Accordingly, the center pixel of the G-type is G, the center pixel of the B-type is B and the center pixel of the B-type is B.

After determining the corresponding type with respect to the window (W), the RGB color distribution in the window (W), i.e., average values for each RGB, is calculated at steps S103 and S104.

FIGS. 3A to 3C illustrate different types of the windows, respectively.

FIG. 3A is a G-type window with a size of 5×5 array since a center pixel, i.e., $x_{33}$, of FIG. 3A is G.

In this case, the total number of the G pixels is 13 including $x_{11}, x_{13}, x_{15}, x_{22}, x_{24}, x_{31}, x_{33}, x_{35}, x_{42}, x_{44}, x_{51}, x_{53}$ and $x_{55}$. Among these 13 G pixels, the center pixel, i.e., $x_{33}$, is omitted since $x_{33}$ is the G pixel itself and $x_{11}, x_{15}, x_{51}$ and $x_{55}$ are also omitted since these pixels located in the most outer corners of the window (W) are not substantially influential.

Accordingly, the G average value of the G-type window (W), i.e., AvgG, is calculated by a formula of $x_{13}+x_{15}+x_{22}+x_{24}+x_{31}+x_{35}+x_{42}+x_{53}/8$.

Chroma illustrating R/B color components can be expressed with 'C' and thus, the chroma is expressed with C1 and C2.

Accordingly, a C1 average value in the G-type window, i.e., AvgC1, is calculated by a formula of $x_{12}+x_{14}+x_{32}+x_{34}+x_{52}+x_{54}/6$ and a C2 average value in the G-type window, i.e., AvgC2, is calculated by a formula of $x_{21}+x_{23}+x_{25}+x_{41}+x_{43}+x_{45}/6$.

FIGS. 3B and 3C illustrate an R-type window with a size of 5×5 array and a B-type window with a size of 5×5 array, respectively.

In this case, the total number of the G pixels is 12 including $x_{12}, x_{14}, x_{21}, x_{23}, x_{25}, x_{32}, x_{34}, x_{41}, x_{43}, x_{45}, x_{52}$ and $x_{54}$. Among these 12 G pixels, 4 G pixels including $x_{12}, x_{14}, x_{52}$, and $x_{54}$ are omitted since these G pixels located in the most outer corners of the window (W) are not substantially influential.

Accordingly, a G average value of the R/B type windows, i.e., 'AvgG', is calculated by a formula of $x_{21}+x_{23}+x_{25}+x_{32}+x_{34}+x_{41}+x_{43}+x_{45}/8$.

Herein, for C1 and C2, B and R are alternated. A C1 average value, i.e., AvgC1, is calculated by an expression of $x_{11}+x_{13}+x_{15}+x_{31}+x_{35}+x_{51}+x_{53}/8$. A C2 average value, i.e., AvgC2, is calculated by a formula of $x_{22}+x_{24}+x_{42}+x_{44}/4$.

Subsequently, at step S105, each of the RGB average values, i.e., AvgR, AvgG and AvgB, is compared with each dark condition threshold value, i.e., $Th_1, Th_2$ and $Th_3$.

As a result of the above comparison, if all of the RGB average values, i.e., AvgR, AvgG and AvgB, are smaller than each of the dark condition threshold values, i.e., $Th_1, Th_2$ and $Th_3$, the center pixel, $x_{33}$ is determined as a dark condition. If at least one of the RGB average values, i.e., AvgR, AvgG and AvgB, is bigger than each of the dark condition threshold values, i.e., $Th_1, Th_2$ and $Th_3$, it can be said that the center pixel, i.e., $x_{33}$, is not a dark condition.

Herein, the dark condition threshold values, i.e., $Th_1, Th_2$ and $Th_3$, are variable.

It is possible to perform the steps of determining the above explained dark condition simultaneously with the color interpolation. Accordingly, hereinafter, the steps of determining the dark condition and interpolating the colors will be examined.

First, a window with a size of 5×5 array is set based on a center pixel, i.e., $x_{33}$. Afterwards, RGB average values, i.e., AvgR, AvgG, AvgB, in each corresponding window are calculated. That is, RGB distribution is obtained.

Subsequently, the RGB average values, i.e., AvgR, AvgG and AvgB, are compared with dark condition threshold values, i.e., $Th_1, Th_2$ and $Th_3$. Thereafter, if all of the RGB average values, i.e., AvgR, AvgG and AvgB, are smaller than the dark condition threshold values, i.e., $Th_1, Th_2$ and $Th_3$, the center pixel, i.e., $x_{33}$, is determined as a dark condition. Since the center pixel, i.e., $x_{33}$, is determined as the dark condition, a black and white image processing for interpolating all of the RGB values of the center pixel, i.e., $x_{33}$, into the G average value is performed. That is, the R and B pixels are replaced by the G pixel taking more than 50% of brightness information in order not to degrade brightness of an image. In case of that the RGB average values are the same, each corresponding pixel uses a block and white image without chroma.

Meanwhile, if at least one of the RBG average values, i.e., AvgR, AvgG and AvgB, is bigger than the dark condition threshold values, i.e., $Th_1, Th_2$ and $Th_3$, the center pixel, i.e., $x_{33}$, is not determined as a dark condition. Thus, a normal interpolation is performed since the center pixel, i.e., $x_{33}$, is not the dark condition.

Meanwhile, although the preferred embodiment of the present invention exemplifies pixels arranged in a window with a size of 5×5 array, it is possible to use various types of window.

The present invention described above does not use a color distribution with respect to a whole frame as the conventional color interpolation does. Instead, the present invention forms a window with a size of 5×5 array and determines a local color distribution based on a center pixel by using the window with the size of 5×5 array, thereby determining a dark condition with respect to the local color distribution. Thus, the present invention makes it possible not to degrade chroma with respect to a whole image but locally degrade chroma, thereby producing a black and white image. Through differently and locally performing a color interpolation according to a dark condition determination, it is possible for the present invention to correct an error of an imperfect black possibly generated during an expression of an imperfect black and white image due to the color interpolation and to reduce a color noise in the corresponding portion.

The present invention described above is capable of effectively removing a color noise that can be locally generated as maintaining chroma of an image by locally replacing an image into a black and white image, not by using a conventional method for degrading the chroma through controlling whole color of the image and providing an effect of a light and darkness contrast by certainly changing a dark portion into a black and white image.

The present application contains subject matter related to the Korean patent application No. KR 2004-0032011, filed in the Korean Patent Office on May 6, 2004 the entire contents of which being incorporated herein by reference.

While the present invention has been described with respect to certain preferred embodiments, it will be apparent to those skilled in the art that various changes and modifications may be made without departing from the spirit and scope of the invention as defined in the following claims.

What is claimed is:

1. A method for interpolating colors, comprising the steps of:
    setting a predetermined window based on a center pixel;
    calculating an average value for each RGB in the window;
    comparing each of the RGB average values with a corresponding dark condition threshold value;
    determining the center pixel as a dark condition if all of the RGB average values are smaller than the dark condition threshold values; and
    interpolating all of the RGB average values of the center pixel into the G average value as if the center pixel is determined as the dark condition.

2. The method of claim 1, wherein the window forms a pixel array in a size of 5×5 array.

3. The method of claim 2, wherein if at least one of the RBG average values is bigger than the dark condition threshold values, the center pixel is not determined as a dark condition.

4. The method of claim 2, wherein if the center pixel is not the dark condition, a normal color interpolation is performed.

5. The method of claim 1, wherein if at least one of the RBG average values is bigger than the dark condition threshold values, the center pixel is not determined as a dark condition.

6. The method of claim 1, wherein if the center pixel is not the dark condition, a normal color interpolation is performed.

7. The method of claim 1, wherein the window is identified as one of a G-type and an R/B type.

8. The method of claim 1, wherein the dark condition threshold values are variable.

* * * * *

UNITED STATES PATENT AND TRADEMARK OFFICE
CERTIFICATE OF CORRECTION

PATENT NO. : 7,409,084 B2 Page 1 of 1
APPLICATION NO. : 11/094628
DATED : August 5, 2008
INVENTOR(S) : Jung It is certified that error appears in the above-identified patent and that said Letters Patent is hereby corrected as shown below:

In Claim 1, line 11, please delete "as" following "average value".

Signed and Sealed this

Fifth Day of May, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,409,084 B2 | Page 1 of 1 |
| APPLICATION NO. | : 11/094628 | |
| DATED | : August 5, 2008 | |
| INVENTOR(S) | : Jung | |

It is certified that error appears in the above-identified patent and that said Letters Patent is hereby corrected as shown below:

Column 4, In Claim 1, line 64, please delete "as" following "average value".

This certificate supersedes the Certificate of Correction issued May 5, 2009.

Signed and Sealed this

Twenty-sixth Day of May, 2009

JOHN DOLL
*Acting Director of the United States Patent and Trademark Office*